US012705125B2

(12) United States Patent
Zhang

(10) Patent No.: US 12,705,125 B2
(45) Date of Patent: Aug. 11, 2026

(54) METHOD AND APPARATUS FOR AMD SERVER SYSTEM INSTALLATION POWER-OFF PROCESSING, DEVICE, AND MEDIUM

(71) Applicant: Suzhou MetaBrain Intelligent Technology Co., Ltd., Suzhou (CN)

(72) Inventor: Guoqi Zhang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 48 days.

(21) Appl. No.: 18/874,176

(22) PCT Filed: Jun. 28, 2023

(86) PCT No.: PCT/CN2023/103197
§ 371 (c)(1),
(2) Date: Dec. 12, 2024

(87) PCT Pub. No.: WO2024/119787
PCT Pub. Date: Jun. 13, 2024

(65) Prior Publication Data

US 2025/0377977 A1 Dec. 11, 2025

(30) Foreign Application Priority Data

Dec. 6, 2022 (CN) ......................... 202211553101.2

(51) Int. Cl.
*G06F 11/00* (2006.01)
*G06F 11/07* (2006.01)
*G06F 11/14* (2006.01)

(52) U.S. Cl.
CPC ...... *G06F 11/0766* (2013.01); *G06F 11/1417* (2013.01); *G06F 11/1441* (2013.01)

(58) Field of Classification Search
CPC ............. G06F 11/0766; G06F 11/0778; G06F 11/1417; G06F 11/1441; G06F 1/30; G06F 11/3072–3079
See application file for complete search history.

(56) References Cited

U.S. PATENT DOCUMENTS

2006/0156057 A1* 7/2006 Babu ................... G06F 11/0742 714/38.11
2011/0113182 A1* 5/2011 Reyes ................. G06F 21/6209 711/E12.001

(Continued)

FOREIGN PATENT DOCUMENTS

CN 103123586 A 5/2013
CN 109086155 A 12/2018

(Continued)

OTHER PUBLICATIONS

International Search Report cited in PCT/CN2023/103197, mailed Oct. 5, 2023 7 pages.

(Continued)

*Primary Examiner* — Marc Duncan
(74) *Attorney, Agent, or Firm* — Cooper Legal Group, LLC

(57) ABSTRACT

A method for server system installation power-off processing comprises: monitoring whether a first power-off fault occurs during an installation process of the server system, and determining whether the server system is in a normal installation process; recording first power-off fault information in a preset file if determination results are yes; and regularly deleting the preset file in response to detecting that the preset file conforms to a preset verification strategy.

20 Claims, 3 Drawing Sheets

(56) References Cited

U.S. PATENT DOCUMENTS

| | | | | |
|---|---|---|---|---|
| 2013/0145137 | A1* | 6/2013 | Sartorius | G06F 11/1441 713/1 |
| 2014/0006881 | A1* | 1/2014 | Loimuneva | G06F 11/0787 714/57 |
| 2018/0300117 | A1 | 10/2018 | Ackerman | |

FOREIGN PATENT DOCUMENTS

| | | | |
|---|---|---|---|
| CN | 110045971 | A | 7/2019 |
| CN | 111078484 | A | 4/2020 |
| CN | 113553242 | A | 10/2021 |
| CN | 114560366 | A | 5/2022 |
| CN | 114911641 | A | 8/2022 |
| CN | 115167883 | A | 10/2022 |
| CN | 115562900 | A | 1/2023 |

OTHER PUBLICATIONS

Written Opinion cited in PCT/CN2023/103197, mailed Oct. 5, 2023 8 pages.

Notification to Grant Patent Right for Invention cited in CN202211553101.2, mailed Feb. 9, 2023, 3 pages.

Office Action cited in CN202211553101.2, mailed Jan. 10, 2023, 9 pages.

* cited by examiner

METHOD AND APPARATUS FOR AMD SERVER SYSTEM INSTALLATION POWER-OFF PROCESSING, DEVICE, AND MEDIUM

CROSS-REFERENCE TO RELATED APPLICATIONS

This application claims priority to Chinese Patent Application No. 202211553101.2, entitled "METHOD AND APPARATUS FOR AMD SERVER SYSTEM INSTALLATION POWER-OFF PROCESSING, DEVICE, AND MEDIUM", filed to China National Intellectual Property Administration on Dec. 6, 2022, the entire contents of which are incorporated herein by reference.

FIELD

The present application relates to the field of server system installation, and particularly relates to a method and apparatus for server system installation power-off processing, a computer device, and a non-volatile computer-readable storage medium.

BACKGROUND

The AMD server is based on the AMD central processing unit (CPU) as the core server. The AMD server is one of the most rapidly developing server series in recent years, and its performance is in the leading position in the current CPU servers of different architectures. For the server of AMD milan CPU architecture, its high-speed processing performance is pursued by many customers. Servers may be considered as the fundamental carriers of IT information services. For the installation and remote deployment of each server system, a network environment utilizing a preboot execute environment (PXE) is required. In the process of remote deployment and automated operation and maintenance, there may be various abnormal power-off and reboot situations. At this time, there will be a successful system installation but abnormal error reporting, resulting in users and customers spending a lot of time troubleshooting the operating system (OS), thereby reducing the production efficiency.

SUMMARY

An objective of the present application is to provide a method and apparatus for server system installation power-off processing, a computer device, and a non-volatile computer-readable storage medium.

The technical solutions of the present application are as follows. According to a first aspect, the present application provides a method for server system installation power-off processing, comprising:

monitoring whether a first power-off fault occurs during an installation process of a server system, and determining whether the server system is in a normal installation process;

recording first power-off fault information in a preset file in response to the first power-off fault occurring during the installation process of the server system and the server system is in the normal installation process; and regularly deleting the preset file in response to detecting that the preset file conforms to a preset verification strategy.

In one embodiment of the present application, before the regularly deleting the preset file in response to detecting that the preset file conforms to the preset verification strategy, the method further comprises:

monitoring whether a second power-off fault occurs during a reboot process after the installation of the server system is completed; and recording second power-off fault information in the preset file and re-powering on the server in response to the second power-off fault occurring during the reboot process after the installation of the server system is completed.

In one embodiment of the present application, the determining whether the server system is in the normal installation process comprises:

monitoring and saving a first basic input output system (BIOS) usage dynamic, where the first BIOS usage dynamic is a BIOS usage dynamic in response to the server system being powered off;

monitoring and acquiring a second BIOS usage dynamic, where the second BIOS usage dynamic is a BIOS usage dynamic in response to the server system being powered on again after being powered off;

determining whether the first BIOS usage dynamic is consistent with the second BIOS usage dynamic; and determining that the server system is in the normal installation process in response to the first BIOS usage dynamic being consistent with the second BIOS usage dynamic.

In one embodiment of the present application, after the determining whether the first BIOS usage dynamic is consistent with the second BIOS usage dynamic, the method further comprises:

clearing an error reporting log generated by powering off in response to the first BIOS usage dynamic being inconsistent with the second BIOS usage dynamic.

In one embodiment of the present application, the monitoring whether the first power-off fault occurs during an installation process of a server system comprises:

monitoring whether an alternating current (AC) power-off fault and/or a direct current (DC) power-off fault occurs during the installation process of the server system.

In one embodiment of the present application, the monitoring whether the second power-off fault occurs during the reboot process after the installation of the server system is completed comprises:

monitoring whether an AC power-off fault occurs during the reboot process after the installation of the server system is completed.

In one embodiment of the present application, before the recording second power-off fault information in the preset file, the method further comprises:

determining whether the server system is normally installed based on installation information transmitted by a BIOS.

In one embodiment of the present application, the determining whether the server system is normally installed based on installation information transmitted by a BIOS comprises:

acquiring installation monitoring log information transmitted by the BIOS;

determining whether a number of installation monitoring log information is greater than a number of preset monitoring logs based on the installation monitoring log information; and determining that the server system is normally installed in response to the number of installation monitoring log information being not greater than the number of preset monitoring logs.

In one embodiment of the present application, after the determining whether the server system is normally installed based on installation information transmitted by the BIOS, and before the recording second power-off fault information in the preset file, the method further comprises:

performing a secondary verification to determine whether the server system is normally installed.

In one embodiment of the present application, the performing the secondary verification to determine whether the server system is normally installed comprises:

acquiring first target information of the server system from hardware;

acquiring second target information related to the server system; and performing the secondary verification to determine whether the server system is normally installed according to whether the first target information and the second target information are acquired successfully.

In one embodiment of the present application, the acquiring first target information of the server system from hardware comprises:

acquiring target potential information of the server system from the hardware; and acquiring data flow information of successful PXE guiding from firmware, where the target potential information and the data flow information of successful PXE guiding constitute the first target information.

In one embodiment of the present application, the acquiring the target potential information of the server system from the hardware comprises:

acquiring general purpose input output (GPIO) potential information of the server system from the hardware based on a baseboard management controller (BMC).

In one embodiment of the present application, the acquiring the second target information related to the server system comprises:

acquiring a successful boot flag bit of the server system.

In one embodiment of the present application, the performing the secondary verification to determine whether the server system is normally installed according to whether the first target information and the second target information are acquired successfully comprises:

performing the secondary verification to determine that the server system is normally installed in response to detecting that the first target information conforms to a preset condition and successfully acquiring the second target information.

In one embodiment of the present application, the method further comprises: in response to performing the secondary verification to determine that the server system is normally installed, storing the first power-off fault information and the second power-off fault information in the preset file.

In one embodiment of the present application, the regularly deleting the preset file in response to detecting that the preset file conforms to the preset verification strategy comprises:

regularly deleting the preset file in response to detecting that a server system corresponding to the preset file is normally installed and is not turned on within a preset time.

In one embodiment of the present application, before the monitoring whether the first power-off fault occurs during the installation process of the server system, and determining whether the server system is in the normal installation process, the method further comprises:

powering on and starting up the server; and guiding the installation of the server system with the PXE.

According to a second aspect, the present application also provides an apparatus for server system installation power-off processing, comprising:

a monitoring and determination module, configured to monitor whether a first power-off fault occurs during an installation process of a server system, and determine whether the server system is in a normal installation process;

a first recording module, configured to record first power-off fault information in a preset file in response to the first power-off fault occurring during the installation process of the AMD server system and the server system is in the normal installation process; and a regular deletion module, configured to regularly delete the preset file in response to detecting that the preset file conforms to a preset verification strategy.

According to a third aspect, the present application also provides a computer device, comprising:

one or more processors; and a memory associated with the one or more processors, where the memory is configured to store program instructions which, when read and executed by the one or more processors, perform the method for server system installation power-off processing according to any one part in the first aspect.

According to a fourth aspect, the present application also provides a non-volatile computer-readable storage medium storing computer instructions for causing a computer to perform the method for server system installation power-off processing according to any one part in the first aspect.

The advantages of the present application are as follows. The present application provides a method and apparatus for server system installation power-off processing, a computer device, and a non-volatile computer-readable storage medium. The method comprises: monitoring whether the first power-off fault occurs during the installation process of the server system, and determining whether the server system is in the normal installation process; recording the first power-off fault information in the preset file if the first power-off fault occurs during the installation process of the server system and the server system is in the normal installation process; and regularly deleting the preset file in response to detecting that the preset file conforms to the preset verification strategy. A power-down behavior during the installation process of the server system is monitored and determined. If the system is finally installed normally, corresponding error reporting information will not be directly reported to an interactive data language (IDL)/system event log (SEL) log but recorded in a separate temporary preset file for separate processing. If the temporary preset file conforms to the preset verification strategy, it is regularly deleted, which can not only avoid the generation of an error log to mislead users, but also ensure that the server maintains an efficient and stable running status when operating with GPU cards, so as to assist the CPU platform server service to obtain better use experience during the use process.

BRIEF DESCRIPTION OF THE DRAWINGS

In order to more clearly illustrate the technical solutions in the embodiments of the present application, the drawings required in the descriptions of the embodiments will be briefly introduced below. Obviously, the drawings described below are only some embodiments of the present application, and a person skilled in the art may obtain other drawings according to these drawings without involving any inventive effort.

DETAILED DESCRIPTION

Figure 1:
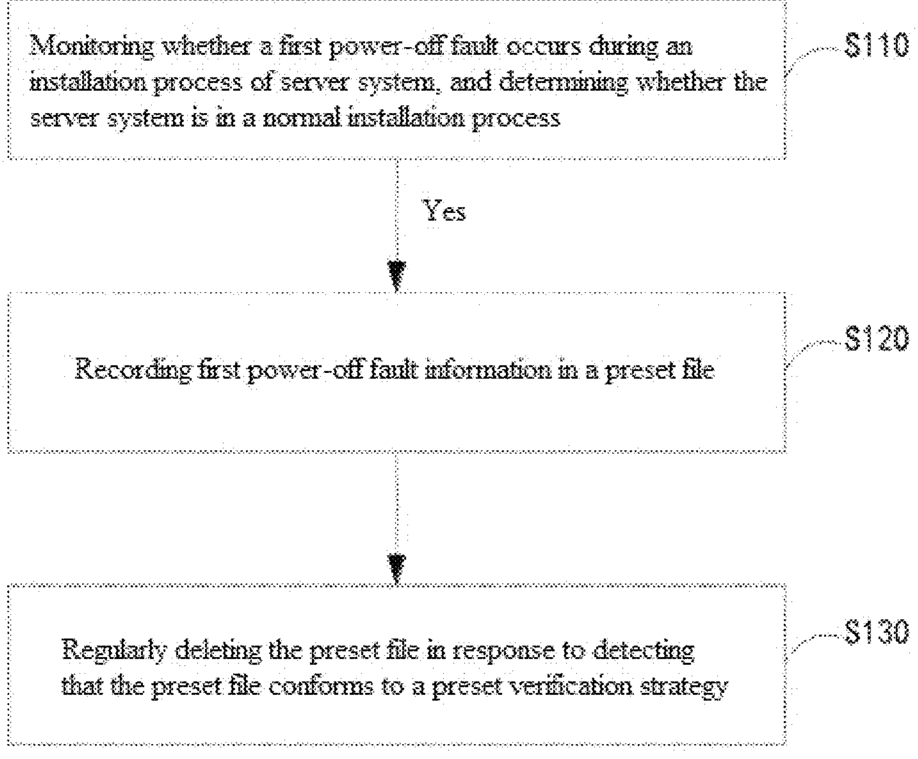
FIG. 1 is a flowchart of a method for server system installation power-off processing provided by the present application.

In order to make the objective, technical solutions, and advantages of the present application clearer, the technical solutions in the embodiments of the present application will be clearly and completely described below in conjunction with the accompanying drawings in the embodiments of the present application. Obviously, the described embodiments are only some embodiments of the present application, not all embodiments. Based on the embodiments of the present application, all other embodiments obtained by a person skilled in the art without inventive effort fall within the scope of the present application.

As described in the background, AC/DC-related power-down behaviors such as abnormal reboot/power-down/secondary reboot may occur during an installation process of a server system in the related art, and corresponding power-off fault information is generated after the power-down. All abnormal error reporting information including the power-off information is currently uploaded to an IDL/SEL log.

For example, if a server power line is unplugged unexpectedly during the installation process, an AC power-off problem occurs, and the whole installation process is forced to be terminated. After the server is re-powered on, if the system installation continues, the firmware BMC of the server monitors and acquires an abnormal error reporting behavior of the system. However, the system may still operate normally at this time. Thus, an abnormal alarm log in an event log of the firmware BMC will be directly presented to the client, which has a certain impact on the usage. For this abnormal AC power-off to terminate the installation, re-powering on is performed to restore the normal installation, but the power-off fault information is also uploaded to the IDL/SEL log. Thus, there will be a case that the ADM server system is successfully installed, but the log still reports an error, causing trouble to the customers.

In addition, for example, the DC power-off behavior occurs during the installation process. This power-off behavior may be caused by the fault of the server itself, leading to a halt in the server installation. After a period of time, the DC power is restored, and the system installation continues. There will also be the case that the ADM server system is successfully installed, but the log still reports an error. Another case is that after the installation is completed, the AC and DC power-off behaviors occur during the process of rebooting to complete configuration initialization. At this time, the firmware BMC of the server will receive a hardware signal that the system installation is completed. However, the significance of this hardware signal becomes moot, as the power-off abnormality occurs during rebooting the system to complete initialization. Then, the system will send some abnormal alarm information to the firmware BMC of the server through some reboot services of the system such as system daemon (systemd, a kind of init software under linux). At this time, the firmware of the server will also send some abnormal alarm information. At this time, the abnormal AC power-off behavior mainly occurs, and for the abnormal AC power-off behavior to terminate the installation under this system reboot condition, the log alarm causes trouble to the customers. However, for the above two behaviors, if the system installation or the system initialization cannot be realized, the abnormal log needs to be reported.

In order to solve the above-mentioned problems, the present application creatively proposes a method and apparatus for server system installation power-off processing, a computer device, and a non-volatile computer-readable storage medium. The installation process of the server system is monitored, and it is determined whether the server system is normally installed after monitoring power-off fault information. If the server system is normally installed, power-off fault information generated by power-down is separately stored in a temporary preset file, and the preset file is verified after the installation is completed. If the temporary preset file conforms to the preset verification strategy, it is regularly deleted, thereby avoiding generating power-off fault information after the server system is normally installed and avoiding causing trouble to users.

The solutions of the present application will be described below in conjunction with the accompanying drawings and embodiments.

Figure 2:
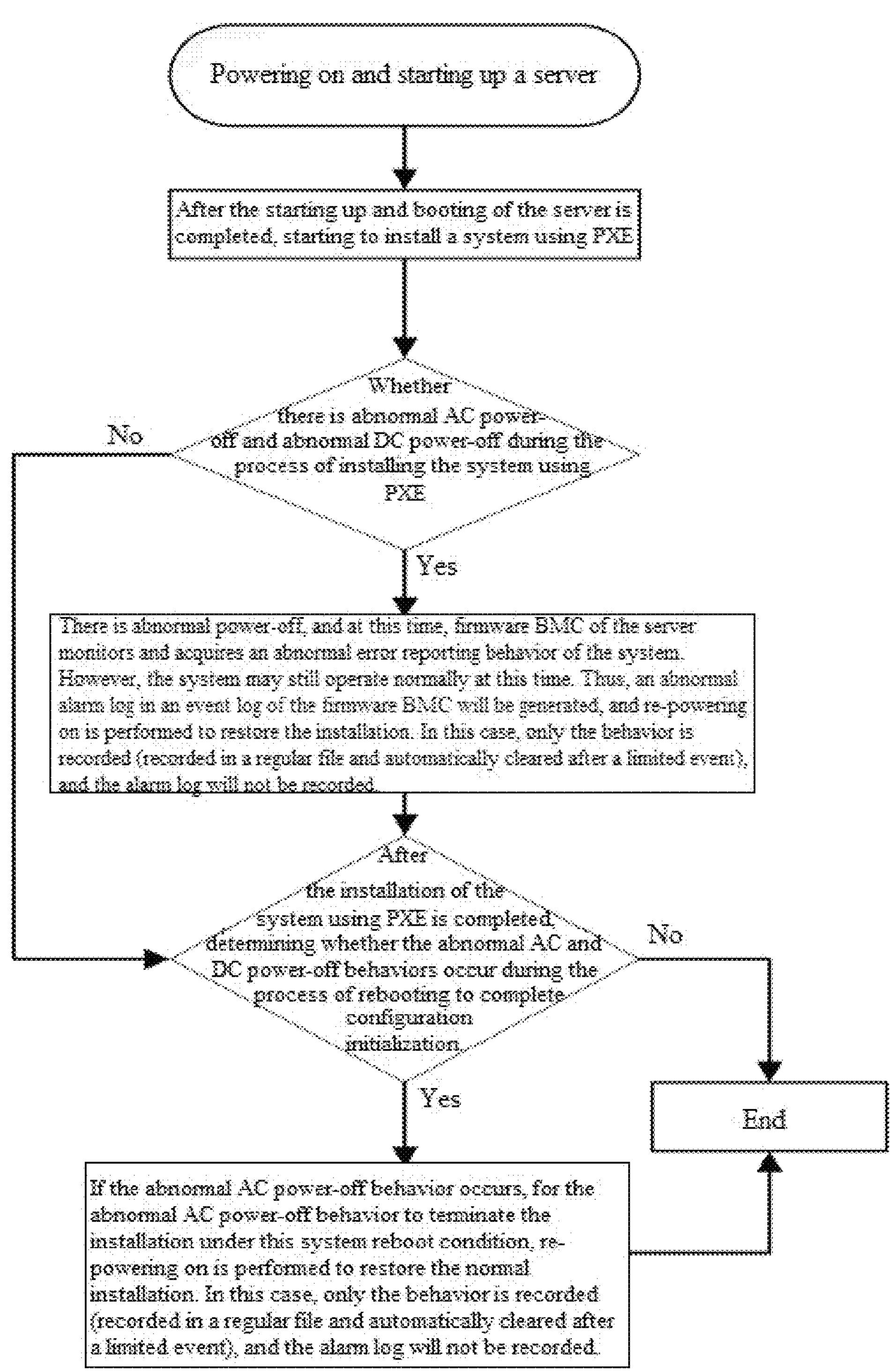
FIG. 2 is a schematic flowchart of server system installation power-off processing provided by an embodiment of the present application.

Embodiment 1: referring to FIGS. 1 and 2, this embodiment describes a process of server system installation power-off processing in the present application.

Referring to FIGS. 1 and 2, this embodiment provides a method for server system installation power-off processing, including:

powering on and starting up the server; and guiding the installation of the server system with PXE.

After the start-up of the server is completed, the server system starts to be installed using the PXE.

At S110, it is monitored whether a first power-off fault occurs during an installation process of the server system, and it is determined whether the server system is in a normal installation process.

If the first power-off fault occurs during the installation process of the server system and the server system is in the normal installation process, the process proceeds to S120.

Monitoring whether the first power-off fault occurs during the installation process of the server system includes:

monitoring whether an AC power-off fault and/or a DC power-off fault occurs during the installation process of the server system.

The power supply of the server system is powered off, and the BMC monitors and acquires abnormal power-off error reporting information sent by the server system, i.e., monitoring that the first power-off fault occurs during the installation process of the server system.

When it is monitored that at least one of the AC power-off fault and the DC power-off fault occurs during the installation process of the server system, and after the server system is re-powered on and continues to be installed, it is determined whether there is an abnormality in the installation process through monitored BIOS usage dynamics. It is determined whether a BIOS usage dynamic when the server system is powered off is consistent with a BIOS usage dynamic after the server system is re-powered on.

Determining whether the server system is in the normal installation process includes:

monitoring and saving a first BIOS usage dynamic, where the first BIOS usage dynamic is the BIOS usage dynamic when the server system is powered off;

monitoring and acquiring a second BIOS usage dynamic, where the second BIOS usage dynamic is the BIOS usage dynamic when the server system is powered on again after being powered off;

determining whether the first BIOS usage dynamic is consistent with the second BIOS usage dynamic;

determining that the server system is in the normal installation process if the first BIOS usage dynamic is consistent with the second BIOS usage dynamic, and then entering S120; and keeping the existing generated power-off error reporting information unchanged if the first BIOS usage dynamic is inconsistent with the second BIOS usage dynamic, and reserving subsequent determination and reporting.

At S120, first power-off fault information is recorded in a preset file.

After the AC power-off fault, or the DC power-off fault, or the AC power-off fault and the DC power-off fault occur during the installation process of the server system, after normal installation is continued after re-powering on, the first power-off fault information generated by the power-off is not stored in the IDL/SEL log, but is recorded in a separate preset file.

It is monitored whether a second power-off fault occurs during a reboot process after the installation of the server system is completed. If the second power-off fault occurs during the reboot process after the installation of the server system is completed, the step of recording the second power-off fault information in the preset file and re-powering on the server is entered.

In one implementation, monitoring whether the second power-off fault occurs during the reboot process after the installation of the server system is completed includes:

monitoring whether an AC power-off fault occurs during the reboot process after the installation of the server system is completed.

After the installation of the server system is completed, reboot is needed to complete configuration initialization. It is monitored whether an AC power-off situation occurs during the process of rebooting the server system to complete configuration initialization.

After it is monitored that an abnormal AC power-off behavior occurs during the process of rebooting the server system to complete configuration initialization, the installation of the server system is terminated, and the server system is re-powered on to restore initialization. Second power-off fault information of rebooting to generate the AC power-off fault is recorded in a separate preset file.

In one embodiment of the present application, before recording second power-off fault information in the preset file, the method further includes:

determining whether the server system is normally installed based on installation information transmitted by a BIOS.

In order to avoid mistakenly determining the power-off fault information, i.e., in order to avoid the case that the installation and rebooting of the server system is completed, but the server system is not normally installed and cannot be used subsequently, and the power-off fault information is recorded in a separate temporary preset file and deleted, and the situation of repairing the fault cannot be viewed, it is necessary to determine whether the server system can be normally installed and used by viewing the installation information transmitted by the BIOS after the rebooting of the server system is completed and before the preset file is regularly deleted. The standard determination for the normal installation of the server system is that PXE guides the installation of the server system to start monitoring the system installation process without generating abnormal error reporting, until after the system is installed and rebooted, the number of normal monitoring logs acquired from the BMC does not exceed a limited number, and no abnormal black box log is generated during the installation of the system. If an abnormal power-off behavior occurs, the logs added to the black box during monitoring the installation of the system will not exceed the size defined before and after the power-off.

Determining whether the server system is normally installed based on the installation information transmitted by the BIOS includes:

acquiring installation monitoring log information transmitted by the BIOS.

The installation monitoring log information transmitted by the BIOS from PXE guiding the installation of the server system is acquired.

It is determined whether the number of installation monitoring log information is greater than the number of preset monitoring logs based on the installation monitoring log information. It is determined that the server system is normally installed if the number of installation monitoring log information is not greater than the number of preset monitoring logs.

In the whole process of the normal installation of the server system, there should be four phase logs of four phases of PXE guiding, installation, rebooting and entering the system, and completing rebooting. It is determined whether the server system is normally installed by checking whether the number of logs in the installation monitoring logs transmitted by the BIOS is greater than four and whether there are redundant logs. If there is no redundant log, the server system is normally installed.

In one embodiment of the present application, after the determining whether the server system is normally installed based on installation information transmitted by a BIOS, and before recording second power-off fault information in the preset file, the method further includes:

performing a secondary verification to determine whether the server system is normally installed.

In order to prevent the information transmitted by the BIOS from being incorrect, it is necessary to verify whether the server system is normally installed again before regularly deleting the preset file.

In one implementation, performing secondary verification to determine whether the server system is normally installed includes:

acquiring first target information of the server system from hardware.

In one implementation, acquiring the first target information of the server system from hardware includes:

acquiring target potential information of the server system from the hardware.

This step includes:

acquiring GPIO potential information of the server system from the hardware based on the BMC.

The BMC acquires the GPIO potential information from the hardware to determine whether the installation of the system is completed.

Data flow information of successful PXE guiding is acquired from firmware, where the target potential information and the data flow information of successful PXE guiding constitute the first target information.

Whether an OS of the system is successfully installed is obtained from another firmware BIOS, mainly from whether the system can smoothly enter the system from the BIOS guiding. The firmware BMC needs to acquire the data flow information of successful PXE guiding from the BIOS.

Second target information related to the server system is acquired.

Acquiring the second target information related to the server system includes:

acquiring a successful boot flag bit of the server system.

The BMC determines whether the system is actually installed normally through PXE by determining whether the successful boot flag bit can be acquired from the system itself. If the successful boot flag bit of the system may be successfully acquired, the system is actually installed normally through PXE. That is to say, it is determined whether the server system is normally installed by reversely deducing the result, so as to determine whether mistakenly determining the normal installation of the server system through the first target information in the earlier stage, and also perform a final verification for a log reporting abnormal error reporting to the system in the later stage.

The secondary verification is performed to determine whether the server system is normally installed according to whether the first target information and the second target information are acquired successfully.

Performing the secondary verification to determine whether the server system is normally installed according to whether the first target information and the second target information are acquired successfully includes:

performing the secondary verification to determine that the server system is normally installed in response to detecting that the first target information conforms to a preset condition and successfully acquiring the second target information.

The second power-off fault information is recorded in the preset file, and the server is re-powered on.

In response to performing the secondary verification to determine that the server system is normally installed, storing the first power-off fault information and the second power-off fault information in the preset file.

At S130, the preset file is regularly deleted in response to detecting that the preset file conforms to a preset verification strategy.

In one implementation, regularly deleting the preset file in response to detecting that the preset file conforms to the preset verification strategy includes:

regularly deleting the preset file in response to detecting that a server system corresponding to the preset file is normally installed and is not turned on within a preset time.

It is necessary to determine whether the power-off fault information may be deleted before setting regular deletion of the power-off fault information recorded in the preset file. The verification strategies for whether the power-off fault information logs are deleted at different stages of the server system installed using PXE guiding are different. More concretely, 1, with regard to a power-off fault log reported by a server system which is not installed completely, it is found that the server system does not complete the system installation after being corrected according to a correction standard for the normal installation of the system (the step of determining whether the server system is normally installed based on the installation information transmitted by the BIOS, and the step of performing a secondary verification to determine whether the server system is normally installed). At this time, no excessive shielding processing or other redundant operations are performed on the log reporting the system unable to complete the installation, and the power-off fault log is reported according to a normal flow, i.e., recording the power-off fault log in the DL/SEL log; 2, after the installation of the system using PXE is completed, it is verified and confirmed that there is no problem after the system is installed normally through the step of determining whether the server system is normally installed based on the installation information transmitted by the BIOS and the step of performing the secondary verification to determine whether the server system is normally installed. At this time, if there is AC or DC power-off fault information, the existing normal log is kept unchanged, and the power-off fault information is transferred to a temporary file, i.e., the preset file, and would be automatically deleted if not used for viewing in a limited time; 3, after the installation of the system using PXE is completed, it is verified and confirmed that the system installation is not completed through the step of determining whether the server system is normally installed based on the installation information transmitted by the BIOS and the step of performing the secondary verification to determine whether the server system is normally installed. At this moment, if there is AC or DC power-off and the installation is continued, the existing log is kept unchanged, and the power-off fault information log is reported; 4, after the installation of the system using PXE is completed, it has been confirmed that the system installation is not completed. At this time, if there is AC or DC power-off and the installation is continued, the existing log is kept unchanged, but the normal log is reported. It is necessary to report the abnormality that the system is not installed completely according to the abnormal situation that the system is not installed completely.

Figure 3:
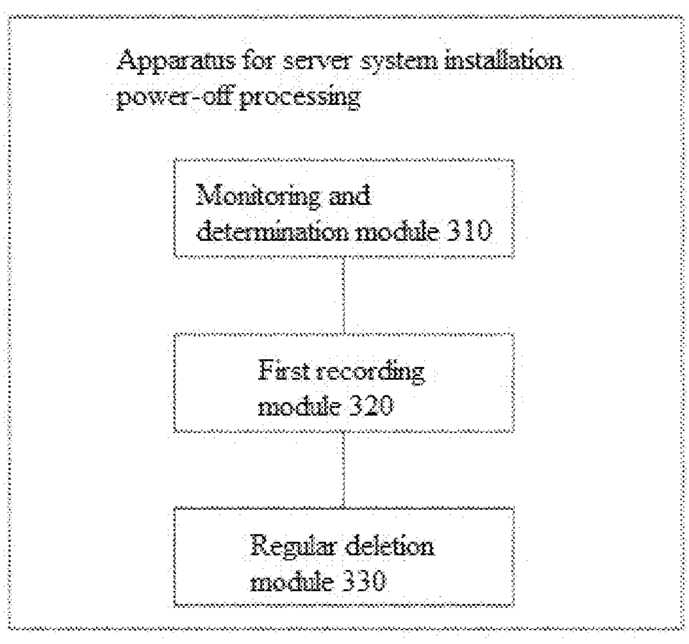
FIG. 3 is a structural diagram of an apparatus for server system installation power-off processing provided by the present application.

Embodiment 2: corresponding to the above-mentioned embodiment 1. An apparatus for server system installation power-off processing provided in the present application will be described below with reference to FIG. 3. The apparatus may be realized by hardware or software, and may also be realized by a combination of hardware and software, and the present application is not limited thereto.

In one example, the present application provides an apparatus for server system installation power-off processing, including:

a monitoring and determination module 310, configured to monitor whether a first power-off fault occurs during an installation process of a server system, and determine whether the server system is in a normal installation process;

a first recording module 320, configured to record first power-off fault information in a preset file if the first power-off fault occurs during the installation process of the server system and the server system is in the normal installation process; and a regular deletion module 330, configured to regularly delete the preset file in response to detecting that the preset file conforms to a preset verification strategy.

In one implementation, the apparatus further includes:

a first monitoring module, configured to monitor whether a second power-off fault occurs during a reboot process after the installation of the server system is completed before the regular deletion module 330 regularly deletes the preset file in response to detecting that the preset file conforms to the preset verification strategy;

and a second recording module, configured to record second power-off fault information in the preset file and re-power on the server when a monitoring result of the first monitoring module is yes.

In one embodiment of the present application, the monitoring and determination module 310 includes:

a first monitoring unit, configured to monitor and save a first BIOS usage dynamic, where the first BIOS usage dynamic is a BIOS usage dynamic when the server system is powered off;

a second monitoring unit, configured to monitor and acquire a second BIOS usage dynamic, where the second BIOS usage dynamic is a BIOS usage dynamic when the server system is powered on again after being powered off; and a first determination unit, configured to determine whether the first BIOS usage dynamic is consistent with the second BIOS usage dynamic.

The monitoring and determination module 310 determines that the server system is in the normal installation process if a determination result of the first determination unit is yes.

In one embodiment of the present application, the monitoring and determination module 310 further includes:

a clearing unit, configured to clear an error reporting log generated by powering off after the determination result of the first determination unit is no.

In one embodiment of the present application, the monitoring and determination module 310 is configured to: monitor whether an AC power-off fault and/or a DC power-off fault occurs during the installation process of the server system.

In one embodiment of the present application, the first monitoring module is configured to: monitor whether an AC power-off fault occurs during the reboot process after the installation of the server system is completed.

In one embodiment of the present application, the apparatus further includes:

a first determination module, configured to determine whether the server system is normally installed based on installation information transmitted by a BIOS before the second recording module records the second power-off fault information in the preset file.

In one embodiment of the present application, the first determination module includes:

a first acquisition unit, configured to acquire installation monitoring log information transmitted by the BIOS; and a second determination unit, configured to determine whether the number of installation monitoring log information is greater than the number of preset monitoring logs based on the installation monitoring log information.

The first determination module determines that the server system is normally installed if a determination result of the second determination unit is no.

In one embodiment of the present application, the apparatus further includes:

a secondary verification module, configured to perform a secondary verification to determine whether the server system is normally installed after the first determination module determines whether the server system is normally installed based on the installation information transmitted by the BIOS, and before the second recording module records the second power-off fault information in the preset file.

In one embodiment of the present application, the secondary verification module includes:

a second acquisition unit, configured to acquire first target information of the server system from hardware;

a third acquisition unit, configured to acquire second target information related to the server system; and a verification unit, configured to perform the secondary verification to determine whether the server system is normally installed according to whether the first target information and the second target information are acquired successfully.

In one embodiment of the present application, the second acquisition unit includes:

a first acquisition subunit, configured to acquire target potential information of the server system from the hardware; and a second acquisition subunit, configured to acquire data flow information of successful PXE guiding from firmware, where the target potential information and the data flow information of successful PXE guiding constitute the first target information.

In one embodiment of the present application, the first acquisition subunit is configured to: acquiring GPIO potential information of the server system from the hardware based on a BMC.

The third acquisition unit is configured to: acquire a successful boot flag bit of the server system.

In one embodiment of the present application, the verification unit includes:

a response verification subunit, configured to perform the secondary verification to determine that the server system is normally installed in response to detecting that the first target information conforms to a preset condition and successfully acquiring the second target information.

In one embodiment of the present application, the first recording module 320 and the second recording module store the first power-off fault information and the second power-off fault information in the preset file in response to performing the secondary verification to determine that the server system is normally installed.

In one embodiment of the present application, the regular deletion module 330 is configured to regularly delete the preset file in response to detecting that a server system corresponding to the preset file is normally installed and is not turned on within a preset time.

In one implementation, the apparatus further includes:

a power-on module, configured to power on and start up the server before the monitoring and determination module 310 monitors whether a power-off fault occurs during the installation process of the server system and determines whether the server system is in the normal installation process; and a guiding installation module, configured to guide the installation of the server system with PXE before the monitoring and determination module 310 monitors whether a power-off fault occurs during the installation process of the server system and determines whether the server system is in the normal installation process, and after the power-on module powers on and starts up the server.

Figure 4:
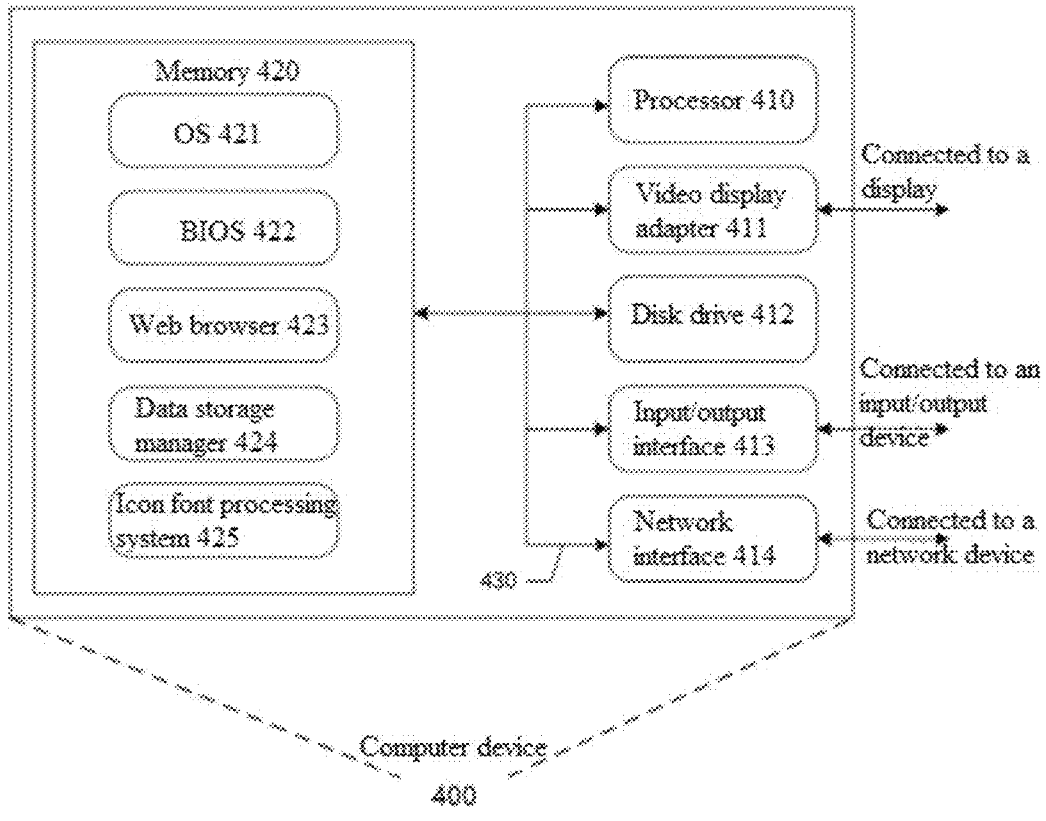
FIG. 4 is an architectural diagram of a computer device provided by the present application.

Embodiment 3: corresponding to the above-mentioned embodiment 1 to embodiment 2. The computer device provided by the present application will be described below with reference to FIG. 4. In one example, as shown in FIG. 4, the present application provides a computer device, including:

one or more processors; and a memory associated with the one or more processors, where the memory is configured to store program instructions which, when read and executed by the one or more processors, perform the following operations:

monitoring whether a first power-off fault occurs during an installation process of a server system, and determining whether the server system is in a normal installation process;

recording first power-off fault information in a preset file if the first power-off fault occurs during the installation process of the server system and the server system is in the normal installation process; and regularly deleting the preset file in response to detecting that the preset file conforms to a preset verification strategy.

The program instructions, when read and executed by the one or more processors, further perform the following operations:

monitoring whether a second power-off fault occurs during a reboot process after the installation of the server system is completed; and recording second power-off fault information in the preset file and re-powering on the server if the second power-off fault occurs during the reboot process after the installation of the server system is completed.

The program instructions, when read and executed by the one or more processors, further perform the following operations:

monitoring and saving a first BIOS usage dynamic, where the first BIOS usage dynamic is a BIOS usage dynamic when the server system is powered off;

monitoring and acquiring a second BIOS usage dynamic, where the second BIOS usage dynamic is a BIOS usage dynamic when the server system is powered on again after being powered off;

determining whether the first BIOS usage dynamic is consistent with the second BIOS usage dynamic; and determining that the server system is in the normal installation process if the first BIOS usage dynamic is consistent with the second BIOS usage dynamic.

The program instructions, when read and executed by the one or more processors, further perform the following operations:

clearing an error reporting log generated by powering off if the first BIOS usage dynamic is inconsistent with the second BIOS usage dynamic.

The program instructions, when read and executed by the one or more processors, further perform the following operations:

monitoring whether an AC power-off fault and/or a DC power-off fault occurs during the installation process of the server system.

The program instructions, when read and executed by the one or more processors, further perform the following operations:

monitoring whether an AC power-off fault occurs during the reboot process after the installation of the server system is completed.

The program instructions, when read and executed by the one or more processors, further perform the following operations:

determining whether the server system is normally installed based on installation information transmitted by a BIOS.

The program instructions, when read and executed by the one or more processors, further perform the following operations:

acquiring installation monitoring log information transmitted by the BIOS;

determining whether the number of installation monitoring log information is greater than the number of preset monitoring logs based on the installation monitoring log information; and determining that the server system is normally installed if the number of installation monitoring log information is not greater than the number of preset monitoring logs.

The program instructions, when read and executed by the one or more processors, further perform the following operations:

performing a secondary verification to determine whether the server system is normally installed.

The program instructions, when read and executed by the one or more processors, further perform the following operations:

acquiring first target information of the server system from hardware;

acquiring second target information related to the server system; and performing the secondary verification to determine whether the server system is normally installed according to whether the first target information and the second target information are acquired successfully.

The program instructions, when read and executed by the one or more processors, further perform the following operations:

acquiring target potential information of the server system from the hardware; and acquiring data flow information of successful PXE guiding from firmware, where the target potential information and the data flow information of successful PXE guiding constitute the first target information.

The program instructions, when read and executed by the one or more processors, further perform the following operations:

acquiring GPIO potential information of the server system from the hardware based on a BMC.

The program instructions, when read and executed by the one or more processors, further perform the following operations:

acquiring a successful boot flag bit of the server system.

The program instructions, when read and executed by the one or more processors, further perform the following operations:

performing the secondary verification to determine that the server system is normally installed in response to detecting that the first target information conforms to a preset condition and successfully acquiring the second target information.

The program instructions, when read and executed by the one or more processors, further perform the following operations:

in response to performing the secondary verification to determine that the server system is normally installed, storing the first power-off fault information and the second power-off fault information in the preset file.

The program instructions, when read and executed by the one or more processors, further perform the following operations:

regularly deleting the preset file in response to detecting that n server system corresponding to the preset file is normally installed and is not turned on within a preset time.

The program instructions, when read and executed by the one or more processors, further perform the following operations:

powering on and starting up the server; and guiding the installation of the server system with PXE.

The program instructions, when read and executed by the one or more processors, may also perform operations corresponding to the various steps in the above-mentioned method embodiments with reference to the above description, which will not be repeated here. Referring to FIG. 4, an architecture of a computer device is exemplarily illustrated. The computer device may include a processor 410, a video display adapter 411, a disk drive 412, an input/output interface 413, a network interface 414, and a memory 420. The above-mentioned processor 410, video display adapter 411, disk drive 412, input/output interface 413, network interface 414, and memory 420 may be communicatively connected through a communication bus 430.

The processor 410 may be implemented by a CPU, a microprocessor, an application specific integrated circuit (ASIC), or one or more integrated circuits for executing relevant programs to realize the technical solutions provided in the present application.

The memory 420 may be implemented in the form of a read only memory (ROM), a random access memory (RAM), a static storage device, a dynamic storage device, etc. The memory 420 may store an OS 421 configured to control the operation of the computer device 400, and a BIOS 422 configured to control low level operations of the computer device 400. In addition, a web browser 423, a data storage manager 424, an icon font processing system 425, and the like may also be stored. The above-mentioned icon font processing system 425 may be an application program that implements the operations of the foregoing steps in the embodiments of the present application. In general, when the technical solutions provided by the present application are implemented in software or firmware, the relevant program code is stored in the memory 420 and invoked for execution by the processor 410.

The input/output interface 413 is configured to connect to an input/output module to realize information input and output. The input/output module may be configured as an assembly in the device (not shown in the figure) or may be externally connected to the device to provide corresponding functions. An input device may include a keyboard, a mouse, a touch screen, a microphone, various types of sensors, etc. An output device may include a display, a speaker, a vibrator, an indicator lamp, etc.

The network interface 414 is configured to connect to a communication module (not shown in the figure) to realize the communication interaction between the device and other devices. The communication module may realize communication through wired mode (such as USB and network cable) and may also realize communication through wireless mode (such as mobile network, WIFI, and bluetooth).

The bus 430 includes a pathway to transfer information between various assemblies (such as the processor 410, the video display adapter 411, the disk drive 412, the input/output interface 413, the network interface 414, and the memory 420) of the device.

In addition, the computer device 400 may also obtain information of detailed retrieval conditions from a virtual resource object retrieval condition information database 441 for making condition determinations, etc.

It should be noted that although the above-mentioned computer device 400 only shows the processor 410, the video display adapter 411, the disk drive 412, the input/output interface 413, the network interface 414, the memory 420, the bus 430, etc., in a detailed implementation, the computer device may also include other assemblies necessary for normal running. In addition, a person skilled in the art will appreciate that the above-mentioned device may also include only the assemblies necessary to implement the solutions of the present application and not necessarily include all the assemblies shown in the drawings.

Embodiment 4: corresponding to the above-mentioned embodiment 1 to embodiment 3. The non-volatile computer-readable storage medium provided by the present application will be described below. In one example, the present application provides a non-volatile computer-readable storage medium storing computer instructions for causing a computer to perform the following operations:

monitoring whether a first power-off fault occurs during an installation process of a server system, and determining whether the server system is in a normal installation process;

recording first power-off fault information in a preset file if the first power-off fault occurs during the installation process of the server system and the server system is in the normal installation process; and regularly deleting the preset file in response to detecting that the preset file conforms to a preset verification strategy.

The computer instructions further cause the computer to perform the following operations:

monitoring whether a second power-off fault occurs during a reboot process after the installation of the server system is completed; and recording second power-off fault information in the preset file and re-powering on the server if the second power-off fault occurs during the reboot process after the installation of the server system is completed.

The computer instructions further cause the computer to perform the following operations:

monitoring and saving a first BIOS usage dynamic, where the first BIOS usage dynamic is a BIOS usage dynamic when the server system is powered off;

monitoring and acquiring a second BIOS usage dynamic, where the second BIOS usage dynamic is a BIOS usage dynamic when the server system is powered on again after being powered off;

determining whether the first BIOS usage dynamic is consistent with the second BIOS usage dynamic; and determining that the server system is in the normal installation process if the first BIOS usage dynamic is consistent with the second BIOS usage dynamic.

The computer instructions further cause the computer to perform the following operations:

clearing an error reporting log generated by powering off if the first BIOS usage dynamic is inconsistent with the second BIOS usage dynamic.

The computer instructions further cause the computer to perform the following operations:

monitoring whether an AC power-off fault and/or a DC power-off fault occurs during the installation process of the server system.

The computer instructions further cause the computer to perform the following operations:

monitoring whether an AC power-off fault occurs during the reboot process after the installation of the server system is completed.

The computer instructions further cause the computer to perform the following operations:

determining whether the server system is normally installed based on installation information transmitted by a BIOS.

The computer instructions further cause the computer to perform the following operations:

acquiring installation monitoring log information transmitted by the BIOS;

determining whether the number of installation monitoring log information is greater than the number of preset monitoring logs based on the installation monitoring log information; and determining that the server system is normally installed if the number of installation monitoring log information is not greater than the number of preset monitoring logs.

The computer instructions further cause the computer to perform the following operations:

performing a secondary verification to determine whether the server system is normally installed.

The computer instructions further cause the computer to perform the following operations:

acquiring first target information of the server system from hardware;

acquiring second target information related to the server system; and performing the secondary verification to determine whether the server system is normally installed according to whether the first target information and the second target information are acquired successfully.

The computer instructions further cause the computer to perform the following operations:

acquiring target potential information of the server system from the hardware; and acquiring data flow information of successful PXE guiding from firmware, where the target potential information and the data flow information of successful PXE guiding constitute the first target information.

The computer instructions further cause the computer to perform the following operations:

acquiring GPIO potential information of the server system from the hardware based on a BMC.

The computer instructions further cause the computer to perform the following operations:

acquiring a successful boot flag bit of the server system.

The computer instructions further cause the computer to perform the following operations:

performing the secondary verification to determine that the server system is normally installed in response to detecting that the first target information conforms to a preset condition and successfully acquiring the second target information.

The computer instructions further cause the computer to perform the following operations:

in response to performing the secondary verification to determine that the server system is normally installed, storing the first power-off fault information and the second power-off fault information in the preset file.

The computer instructions further cause the computer to perform the following operations:

regularly deleting the preset file in response to detecting that a server system corresponding to the preset file is normally installed and is not turned on within a preset time.

The computer instructions further cause the computer to perform the following operations:

powering on and starting up the server; and guiding the installation of the server system with PXE.

Throughout the description of the above implementations, it will be clear to a person skilled in the art that the present application may be implemented by software and a necessary general hardware platform. Based on such an understanding, the technical solutions of the present application, either substantially or in any way contributing to the related art, may be embodied in the form of a software product. A computer software product may be stored in a storage medium, such as a ROM/RAM, a diskette, and an optical disk and include several instructions to cause a computer device (which may be a personal computer, a cloud server, or a network device) to perform the methods of the various embodiments or portions of the embodiments of the present application.

The various embodiments described herein are described in a progressive manner. The identical and similar parts between the various embodiments may refer to each other, and each embodiment focuses on the differences from other embodiments. In particular, with respect to the apparatus embodiment, which is substantially similar to the method embodiment, the description is relatively simple with reference to the description of the method embodiment. The above-mentioned apparatus embodiment is merely schematic. The modules illustrated as separate components may or may not be physically separated, and the components shown as modules may or may not be physical modules, i.e., may be located in one place, or may also be distributed over a plurality of network modules. Some or all of the modules may be selected to achieve the objective of the solutions of the embodiments according to actual needs. A person skilled in the art may understand and implement the same without involving any inventive effort.

In addition, it should be understood that the terms “first”, “second”, and “third” in the present application are used for descriptive purposes only and are not to be construed as indicating or implying relative importance or implicitly indicating the number of technical features indicated. Thus, a feature defined as “first”, “second”, or “third” may explicitly or implicitly include one or more such features.

Of course, the above-mentioned embodiments are only for illustrating the technical conception and features of the present application, and their purpose is to enable a person skilled in the art to understand the contents of the present application and implement it accordingly, and the scope of the present application cannot be limited by this. All the modifications made according to the spirit of the main technical solution of the present application shall be included in the scope of the present application.

What is claimed is:

1. A method for server system installation power-off processing, comprising:

monitoring whether a first power-off fault occurs during an installation process of the server system, and determining whether the server system is in a normal installation process;

recording first power-off fault information in a preset file in response to the first power-off fault occurring during the installation process of the server system and the server system being in the normal installation process; and regularly deleting the preset file in response to detecting that the preset file conforms to a preset verification strategy.

2. The method for server system installation power-off processing according to claim 1, wherein before the regularly deleting the preset file in response to detecting that the preset file conforms to the preset verification strategy, the method further comprises:

monitoring whether a second power-off fault occurs during a reboot process after the installation process of the server system is completed; and recording second power-off fault information in the preset file and re-powering on the server system in response to the second power-off fault occurring during the reboot process after the installation process of the server system is completed.

3. The method for server system installation power-off processing according to claim 2, wherein the determining whether the server system is in the normal installation process comprises:

monitoring and saving a first basic input output system (BIOS) usage dynamic, wherein the first BIOS usage dynamic is a BIOS usage dynamic in response to the server system being powered off;

monitoring and acquiring a second BIOS usage dynamic, wherein the second BIOS usage dynamic is a BIOS usage dynamic in response to the server system being powered on again after being powered off;

determining whether the first BIOS usage dynamic is consistent with the second BIOS usage dynamic; and determining that the server system is in the normal installation process in response to the first BIOS usage dynamic being consistent with the second BIOS usage dynamic.

4. The method for server system installation power-off processing according to claim 3, wherein after the determining whether the first BIOS usage dynamic is consistent with the second BIOS usage dynamic, the method further comprises:

clearing an error reporting log generated by powering off in response to the first BIOS usage dynamic being inconsistent with the second BIOS usage dynamic.

5. The method for server system installation power-off processing according to claim 4, wherein the monitoring whether the first power-off fault occurs during the installation process of the server system comprises:

monitoring whether at least one of an alternating current (AC) power-off fault or a direct current (DC) power-off fault occurs during the installation process of the server system.

6. The method for server system installation power-off processing according to claim 5, wherein the monitoring whether the second power-off fault occurs during the reboot process after the installation process of the server system is completed comprises:

monitoring whether an AC power-off fault occurs during the reboot process after the installation process of the server system is completed.

7. The method for server system installation power-off processing according to claim 2, wherein before the recording the second power-off fault information in the preset file, the method further comprises:

determining whether the server system is normally installed based on installation information transmitted by a basic input output system (BIOS).

8. The method for server system installation power-off processing according to claim 7, wherein the determining whether the server system is normally installed based on the installation information transmitted by the BIOS comprises:

acquiring installation monitoring log information transmitted by the BIOS;

determining whether a number of installation monitoring log information is greater than a number of preset monitoring logs based on the installation monitoring log information; and determining that the server system is normally installed in response to the number of installation monitoring log information being not greater than the number of preset monitoring logs.

9. The method for server system installation power-off processing according to claim 7, wherein after the determining whether the server system is normally installed based on the installation information transmitted by the BIOS, and before the recording the second power-off fault information in the preset file, the method further comprises:

performing a secondary verification to determine whether the server system is normally installed.

10. The method for server system installation power-off processing according to claim 9, wherein the performing the secondary verification to determine whether the server system is normally installed comprises:

acquiring first target information of the server system from hardware;

acquiring second target information related to the server system; and performing the secondary verification to determine whether the server system is normally installed according to whether the first target information and the second target information are acquired successfully.

11. The method for server system installation power-off processing according to claim 10, wherein the acquiring the first target information of the server system from the hardware comprises:

acquiring target potential information of the server system from the hardware; and acquiring data flow information of successful preboot execute environment (PXE) guiding from firmware, wherein the target potential information and the data flow information of successful PXE guiding constitute the first target information.

12. The method for server system installation power-off processing according to claim 11, wherein the acquiring the target potential information of the server system from the hardware comprises:

acquiring general purpose input output (GPIO) potential information of the server system from the hardware based on a baseboard management controller (BMC).

13. The method for server system installation power-off processing according to claim 10, wherein the acquiring the second target information related to the server system comprises:

acquiring a successful boot flag bit of the server system.

14. The method for server system installation power-off processing according to claim 13, wherein the performing the secondary verification to determine whether the server system is normally installed according to whether the first target information and the second target information are acquired successfully comprises:

performing the secondary verification to determine that the server system is normally installed in response to detecting that the first target information conforms to a preset condition and successfully acquiring the second target information.

15. The method for server system installation power-off processing according to claim 14, further comprising: in response to the performing the secondary verification to determine that the server system is normally installed, storing the first power-off fault information and the second power-off fault information in the preset file.

16. The method for server system installation power-off processing according to claim 15, wherein the regularly deleting the preset file in response to detecting that the preset file conforms to the preset verification strategy comprises:

regularly deleting the preset file in response to detecting that the server system corresponding to the preset file is normally installed and is not turned on within a preset time.

17. The method for server system installation power-off processing according to claim 1, wherein before the monitoring whether the first power-off fault occurs during the installation process of the server system, and determining whether the server system is in the normal installation process, the method further comprises:

powering on and starting up the server system; and guiding the installation process of the server system with a preboot execute environment (PXE).

18. A computer device, comprising:

one or more processors; and a memory associated with the one or more processors, wherein the memory is configured to store program instructions which, when read and executed by the one or more processors, perform a method for server system installation power-off processing, comprising:

monitoring whether a first power-off fault occurs during an installation process of the server system, and determining whether the server system is in a normal installation process;

recording first power-off fault information in a preset file in response to the first power-off fault occurring during the installation process of the server system and the server system being in the normal installation process; and regularly deleting the preset file in response to detecting that the preset file conforms to a preset verification strategy.

19. The computer device according to claim 18, wherein the one or more processors, upon execution of the program instructions, are further configured to:

monitor whether a second power-off fault occurs during a reboot process after the installation process of the server system is completed; and record second power-off fault information in the preset file and re-powering on the server in response to the second power-off fault occurring during the reboot process after the installation process of the server system is completed.

20. A non-volatile computer-readable storage medium, storing computer instructions for causing a computer to perform a method for server system installation power-off processing, comprising:

monitoring whether a first power-off fault occurs during an installation process of the server system, and determining whether the server system is in a normal installation process;

recording first power-off fault information in a preset file in response to the first power-off fault occurring during the installation process of the server system and the server system being in the normal installation process; and regularly deleting the preset file in response to detecting that the preset file conforms to a preset verification strategy.

* * * * *